United States Patent [19]
Merriman et al.

[11] 3,785,120
[45] Jan. 15, 1974

[54] RECOVERY OF PURIFIED HELIUM OR HYDROGEN FROM GAS MIXTURES

[75] Inventors: James R. Merriman, Kingston; John H. Pashley, Oakridge; Michael J. Stephenson, Oakridge; David I. Dunthorn, Oakridge, all of Tenn.

[73] Assignee: The United States of America as represented by the United States Atomic Energy Commission, Washington, D.C.

[22] Filed: Oct. 15, 1971

[21] Appl. No.: 189,546

[52] U.S. Cl. .......................... 55/44, 55/48, 55/53, 55/56
[51] Int. Cl. .......................... B01d 53/14
[58] Field of Search .................. 55/40, 43–48, 55/53–56, 66, 89

[56] References Cited
UNITED STATES PATENTS

| | | | |
|---|---|---|---|
| 3,121,624 | 2/1964 | Matsch et al. | 55/44 |
| 3,266,219 | 8/1966 | Woertz | 55/48 |
| 3,594,985 | 7/1971 | Ameen | 55/44 |
| 3,102,012 | 8/1963 | Dowd | 55/48 X |
| 3,021,682 | 2/1962 | Baker et al. | 55/48 X |

*Primary Examiner*—Samih N. Zaharna
*Assistant Examiner*—Richard W. Burks
*Attorney*—John A. Horan

[57] ABSTRACT

A process for the removal of a component selected from helium and hydrogen from gaseous mixtures also containing contaminants. The gaseous mixture is contacted with a liquid fluorocarbon in an absorption zone maintained at superatmospheric pressure to preferentially absorb the contaminants in the fluorocarbon. Unabsorbed gas enriched in hydrogen or helium is withdrawn from the absorption zone as product. Liquid flurocarbon enriched in contaminants is withdrawn separately from the absorption zone.

10 Claims, 1 Drawing Figure

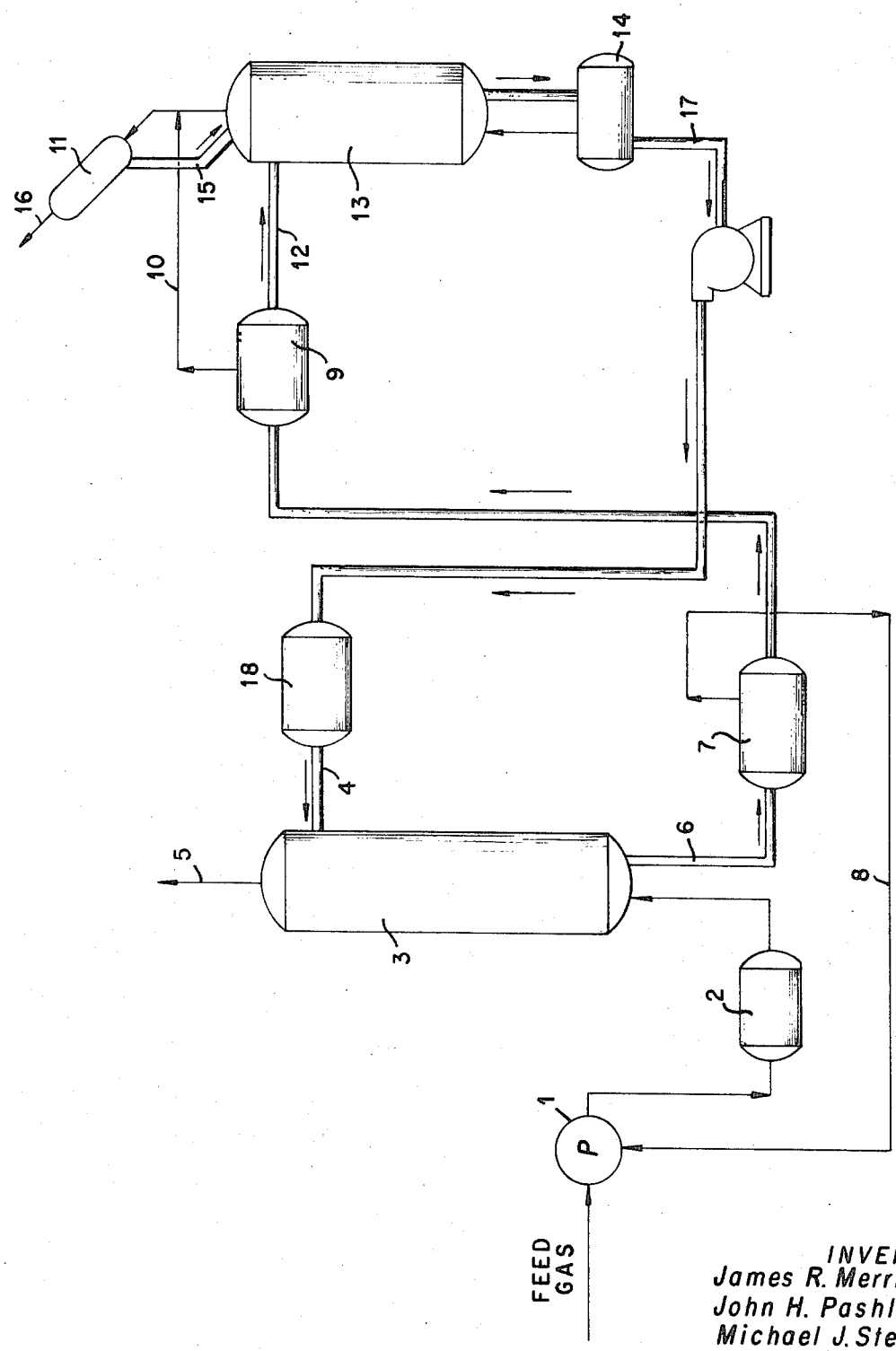

RECOVERY OF PURIFIED HELIUM OR HYDROGEN FROM GAS MIXTURES

BACKGROUND OF THE INVENTION

This invention was made in the course of, or under, a contract with the United States Atomic Energy Commission.

This invention relates broadly to processes for the selective removal of a component selected from the class consisting of hydrogen and helium from gas mixtures containing said component. The gas mixtures referred to may contain any of such other components as othe constituents of air; other hydrocarbons—e.g., methane, acetylene, propane, ethylene—; and various impurities, such as hydrogen sulfide and oxides of carbon, nitrogen, and sulfur. For convenience, the gaseous components from which the hydrogen or helium are separated in accordance with our process will be referred to herein as contaminants. The so-called contaminants may be valuable by-products of the separation process. In referring to the input mixture to be separated by this process, the term "gas mixture" is used herein as inclusive of gases and vapors.

Purified helium is produced commercially by processing natural gas from wells having a high helium content. The well gas is predominantly methane and for economical recovery of helium must contain helium in the amount of about 1–6 percent. The well gas also includes various other hydrocarbons, as well as hydrogen, carbon dioxide, nitrogen, and oxygen.

Helium is recovered from natural gas by liquefying the methane in a cryogenic operation. While that technique for producing helium is in general satisfactory, it is subject to some disadvantages. For example, it is limited to low temperatures. The feed must not only contain relatively high amounts of helium for economical recovery but it must be free from components such as $CO_2$, which might freeze out and thus plug process equipment.

The recovery of essentially pure hydrogen from various gas mixtures containing methane is a commercially important operation. Frequently, hydrogen is recovered from the off-gas from demethanizers, from steam reformers, from electrolytic cells, and from cryogenic upgraders. Such gases may include one or more of the following contaminants: carbon dioxide, carbon monoxide, nitrogen, oxygen, methane, ethane, ethylene, hydrogen sulfide, acetylene, and propane. The amounts of the contaminants in such mixtures may vary over a wide range, such as from 0.5 percent to well in excess of 40 percent by volume. Hitherto, the recovery of hydrogen from such gas mixtures has been accomplished in various ways, including the following: sorption of contaminants, using molecular sieves; and absorption, using hydrocarbon solvents. In general, these methods are subject to various disadvantages. For example, sorption processes typically are limited to batchwise operation and low product recovery, whereas absorption processes typically have limited capacity.

SUMMARY OF THE INVENTION

It is an object of this invention to provide a novel process for the separation of hydrogen or helium from gas mixtures containing the same.

It is another object to provide a process whereby hydrogen or helium is removed from gas mixtures also containing contaminants, such as methane, by selectively absorbing the contaminants in a liquid fluorocarbon.

It is another object to provide a process for such recovery wherein the liquid fluorocarbon absorbent is continuously regenerated and recycled for use.

Other objects of the invention will be made apparent hereinafter.

Briefly, our invention is described as follows: The process of recovering a component selected from the group consisting of hydrogen and helium from a gas mixture containing said component, said process comprising passing said mixture through an absorption zone at super-atmospheric pressure in flowing contact with a liquid fluorocarbon to preferentially absorb in said fluorocarbon constituents of said mixture more soluble therein than said component, withdrawing from said zone a stream of liquid fluorocarbon enriched in said constituents, and separately withdrawing from said zone unabsorbed gas enriched in said component.

In our process the fluorocarbon absorbent flows in a closed loop path. The fluorocarbon enriched in gaseous contaminants (e.g., methane) is regenerated for recycle to the absorption zone. This is accomplished by passing the contaminant-enriched liquid fluorocarbon effluent from the absorption zone through a reduced-pressure stripping zone in flowing contact with a gaseous stripping agent (i.e., a gas or vapor). As a result of this contact, contaminant-enriched gas is desorbed from the fluorocarbon. The desorbed gas is withdrawn from the stripping zone as a by-product stream, whereas the purified (regenerated) liquid fluorocarbon effluent from this zone is recycled to the absorption zone for re-contacting feed gas.

The term "key component" is used herein in connection with design specifications and details of absorption and desorption operations. This term is used, for example, in referring to an absorption operation designed to separate the feed gas into an unabsorbed fraction enriched in the desired component (hydrogen or helium) and an absorbed fraction depleted in the same. In terms of an absorption step, the key component is defined as the most difficult-to-absorb constituent of the depleted (absorbed) fraction. We prefer to select the conditions for absorption—e.g., the absorption pressure and temperature—so as to promote absorption of the key component. For example, in the separation of helium from natural gas, nitrogen is the key component in the absorption operation, and thus the absorption step is designed for its removal. In a following gas-stripping operation, however, methane—or a higher hydrocarbon, if present at significant levels—is the key component (i.e., the most difficult-to-strip component); thus, we prefer to design the stripping operation for its removal. In our process the absorption zone is maintained at superatmospheric pressure to promote the amount of absorption of the key component.

Our process can be conducted with a wide variety of conventional equipment. For example, the above-mentioned absorption and stripping operations can be conducted conveniently in vertically oriented columns of the packed, plate, venturi, or wetted-wall types, or, if desired, in tanks, spray chambers, venturi scrubbers, and the like. The transfer of fluids from contactor to contactor can be accomplished with standard compressors and pumps, in combination with pressure-reducing valves or the like, if desired. Standard heat exchangers and refrigerating devices can be employed to maintain desired operating temperatures and control solvent vapor level losses to desired levels. Conventional reboilers, flash chambers, and condensers also can be employed in conjunction with the columns. The routing and feeding of the process streams can be arranged to take advantage of existing concentration gradients, to minimize back-mixing, and to economize on power input and heat transfer.

BRIEF DESCRIPTION OF THE DRAWING

The single FIGURE is a schematic diagram of a system for conducting a gas-absorption operation and a gas-desorption operation in accordance with this invention.

DESCRIPTION OF THE PREFERRED EMBODIMENTS

Our process is based on our finding that liquid fluorocarbons as a group are unusually suitable for separating gaseous feed mixtures of the kind described above into a fraction enriched in the desired component (hydrogen or helium) and a fraction depleted in the same. That is, we have found that hydrogen and helium are much less soluble in liquid fluorocarbons than contaminants present in the feed gas. Our process takes advantage of this solubility difference, and also capitalizes on our finding that with respect to such contaminants liquid fluorocarbons rate high with respect to capacity and selectivity. Furthermore, liquid fluorocarbons as a group are highly resistant to attrition. They offer the process designer a wide selection of physical properties, thus permitting the selection of near-optimum temperature and pressure conditions for a given operation. Being non-flammable, nontoxic, and essentially inert, liquid fluorocarbons also provide a high margin of process safety.

As an illustration of the usefulness of liquid fluorocarbons for the applications mentioned, we have found that hydrogen is generally about 5–10 times less soluble in such fluorocarbons than is methane under the same conditions. Similarly, helium generally is about 10–20 times less soluble in liquid fluorocarbons than is methane. Table 1, below, presents approximate Henry's Law constants for selected gases in selected hydrocarbon and halocarbon solvents. The Henry's Law constants (which are inversely proportional to solubility) are on a mole basis. The figures shown in parentheses are experimentally derived values. The constants shown in this table were determined by using the thermodynamics-based model of Yen and McKetta (AICHE Journal, 8, 4--September, 1962), together with gas and liquid solubilities taken from the literature.

Table 2, also below, is a similar showing for helium, hydrogen, and sulfur dioxide. In these cases the constants were obtained by (a) plotting the logarithms of the solubilities (Yen-McKetta) of the gases shown in Table 1 versus the so-called Lennard-Jones energy parameter $\epsilon/k$ for the gases shown in Tables 1 and 2; (b) drawing a straight line through the plotted data; and (c) extrapolating the line to give solubilities for helium, hydrogen, carbon monoxide and sulfur dioxide.

The data presented below in Tables 1 and 2 show that helium and hydrogen have a comparatively low solubility in liquid fluorocarbons, as compared with various of the above-mentioned gaseous contaminants—methane, carbon dioxide, carbon monoxide, and nitrogen, for example.

Tables 1 and 2 also show that certain liquid fluorocarbons have a higher capacity for a specific gaseous contaminant than do other fluorocarbons. Thus, from the standpoints of capacity and selectivity, the liquid fluorocarbons offer the plant designer a wide choice with respect to the selection of a particular solvent and leave him comparatively free to optimize pressures, temperatures, and the like for a given separation.

TABLE 1

| Solvent | Henry's Law Constants (in atmospheres), at 75°F |||||||| 
|---|---|---|---|---|---|---|---|---|
|  | Nitrogen | Oxygen | Argon | Krypton | Xenon | Methane | Carbon Dioxide | Nitrous Oxide |
| $CCl_2F_2$ | 420 (690) | 400 (500) | 410 (385) | 230 (165) | 76 (66) | 240 | 88 | 73 (37) |
| $CCl_3F$ | 760 | 530 | 500 | 210 | 62 | 260 | 75 | 59 |
| $CCl_4$ (Carbon Tetrachloride) | 1400 (1600) | 820 (830) | 760 | 260 | 69 | 370 (350) | 93 (93) | 68 (59) |
| $C_2ClF_5$ | 340 | 450 | 510 | 360 | 130 | 320 | 160 | 120 |
| $C_2Cl_2F_4$ | 450 | 410 | 410 | 220 | 72 | 240 | 82 | 67 |
| $C_2Cl_3F_3$ | 650 | 480 | 460 | 200 | 62 | 250 | 73 | 59 |
| $CHClF_2$ | 500 | 410 | 400 | 200 | 65 | 230 | 74 | 61 |
| $CHCl_2F$ | 1100 | 690 | 640 | 230 | 65 | 320 | 83 | 63 |
| $CHCl_3$ (Chloroform) | 1900 (2200) | 910 (1400) | 810 | 230 | 58 | 370 | 79 | 57 |
| $CBrF_3$ | 340 | 450 | 510 | 370 | 130 | 320 | 160 | 120 |
| $C_3Cl_2F_6$ | 460 | 400 | 400 | 210 | 68 | 230 | 78 | 64 |
| $c - C_4F_8$ | 300 | 250 | 240 | 140 | 47 | 150 | 47 | 42 |
| $C_4F_{10}$ (Perfluorobutane) | 260 | 230 | 230 | 140 | 51 | 140 | 49 | 45 |
| $C_6H_6$ (Benzene) | 2100 (2300) | 1200 (1200) | 1100 (1100) | 340 | 86 | 520 (480) | 130 (100) | 87 (75) |
| $C_6H_5Cl$ (Chlorobenzene) | 2400 (2300) | 1200 (1300) | 1000 | 280 | 69 | 460 (480) | 100 | 69 (76) |
| $CH_3I$ (Methyl Iodide) | 3200 | 1400 | 1200 | 300 | 70 | 520 | 110 | 71 |
| $CH_3Br$ (Methyl Bromide) | 2300 | 1100 | 1000 | 280 | 69 | 450 | 100 | 69 |
| $CH_3Cl$ (Methyl Chloride) | 1400 | 790 | 730 | 240 | 66 | 350 | 87 | 64 |
| $CH_2Cl_2$ (Methylene Chloride) | 2800 | 1300 | 1100 | 290 | 70 | 500 | 100 | 71 |
| $C_4H_{10}$ (Butane) | 450 | 320 | 300 | 140 | 47 | 170 | 49 | 42 |

TABLE 2

| Solvent | Henry's Law Constants (in atmospheres), at 75°F | | | |
|---|---|---|---|---|
| | Helium | Hydrogen | Sulfur Dioxide | Carbon Monoxide |
| $CCl_2F_2$ | 2,900 | 1,800 | 40 | 420 |
| $CCl_3F$ | 6,200 | 3,400 | 27 | 730 |
| $CCl_4$ (carbon tetrachloride) | 10,000 | 5,500 (3,100) | 32 (14) | 1200 (1100) |
| $C_2ClF_5$ | 2,000 | 1,400 | 86 | 370 |
| $C_2Cl_2F_4$ | 3,000 | 1,900 | 37 | 420 |
| $C_2Cl_3F_3$ | 4,600 | 2,700 | 28 | 640 |
| $CHClF_2$ | 3,200 | 2,000 | 34 | 480 |
| $CHCl_2F$ | 8,800 | 4,800 | 26 | 1000 |
| $CHCl_3$ (chloroform) | 20,000 | 9,600 (4,500) | 21 | 1500 (1500) |
| $CBrF_3$ | 1,800 | 1,300 | 84 | 400 |
| $C_3Cl_2F_6$ | 3,300 | 2,000 | 34 | 450 |
| $c$-$C_4F_8$ | 1,800 | 1,100 | 23 | 280 |
| $C_4F_{10}$ (perfluorobutane) | 1,000 | 700 | 32 | 250 |
| $C_6F_6$ (benzene) | 17,000 (13,000) | 9,000 (3,900) | 35 (4) | 1700 (1600) |
| $C_6H_5Cl$ (chlorobenzene) | 22,000 | 13,000 (4,000) | 28 (4) | 2000 (1600) |
| $CH_3I$ (methyl iodide) | 33,000 | 18,000 | 25 | 2600 |
| $CH_3Br$ (methyl bromide) | 22,000 | 11,000 | 25 | 1800 |
| $CH_3Cl$ (methyl chloride) | 11,000 | 6,000 | 26 | 1200 |
| $CH_2Cl_2$ (methylene chloride) | 28,000 | 16,000 | 22 | 2300 |
| $C_4H_{10}$ (butane) | 3,200 | 1,900 | 20 | 420 |

With respect to absorption of the above-mentioned contaminants, we have found that the fluoro analog of most hydrocarbons has a higher absorption capacity than the hydrocarbon. Table 3 illustrates our finding that, in general, increasing the degree of fluorine saturation decreases the Henry's Law constant (i.e., increases solubility). It will be noted (lower portion of the table) that increasing the number of carbon atoms does not affect solubility much, on a mole basis, so long as the fluorine-to-carbon ratio is held constant (the remaining bonds being filled with chlorine, in this example). Closing the chain to form fluorinated ring structures does not appear to alter capacity significantly. Table 4, below, further illustrates the capacity advantage obtained with many fluorocarbons as compared with hydrocarbons.

TABLE 3

GENERAL INCREASE IN SOLUBILITY OF PRIMARY AIR COMPONENTS WITH INCREASING FLUORINE SATURATION

| Solvent | Henry's Law Constants (in atmospheres), at 75°F | | | | |
|---|---|---|---|---|---|
| | Nitrogen | Oxygen | Argon | Krypton | Xenon |
| Fully Halogenated Methane Derivatives | | | | | |
| $CCl_2F_2$ | 420 | 400 | 410 | 230 | 76 |
| $CCl_3F$ | 760 | 530 | 500 | 210 | 62 |
| $CCl_4$ (Carbon Tetrachloride) | 1400 | 820 | 760 | 260 | 69 |
| Fully Halogenated Ethane Derivatives | | | | | |
| $C_2ClF_5$ | 340 | 450 | 510 | 360 | 130 |
| $C_2Cl_2F_4$ | 450 | 410 | 410 | 220 | 72 |
| $C_2Cl_3F_3$ | 650 | 480 | 460 | 200 | 62 |
| Partially Halogenated Methane Derivatives | | | | | |
| $CHClF_2$ | 500 | 410 | 400 | 200 | 65 |
| $CHCl_2F$ | 1100 | 690 | 640 | 230 | 65 |
| $CHCl_3$ (Chloroform) | 1900 | 910 | 810 | 230 | 58 |
| Comparable Performance of Fully Halogenated Normal Solvents as Number of Carbons is Increased, with Fluorine-to-Carbon Ratio Remaining Constant at 2-to-1 | | | | | |
| $CCl_2F_2$ | 420 | 400 | 410 | 230 | 76 |
| $C_2Cl_2F_4$ | 450 | 410 | 410 | 220 | 72 |
| $C_3Cl_2F_6$ | 460 | 400 | 400 | 210 | 68 |
| Ring Compound Example | | | | | |
| $C_4H_{10}$ (Butane) | 450 | 320 | 300 | 140 | 47 |
| $C_4F_{10}$ (Fluorobutane) | 260 | 230 | 230 | 140 | 51 |
| $c$-$C_4F_8$ | 300 | 250 | 240 | 140 | 47 |

TABLE 4

CAPACITY DATA FOR TWO FLUOROCARBON-HYDROCARBON ANALOGS

| Gas | Henry's Law Constants (in atmospheres), at 75°F in indicated liquid | | Capacity Advantage of Fluorocarbon, Factor of: | Henry's Law Constants (in atmospheres), at 75°F in indicated liquid | | Capacity Advantage of Fluorocarbon, Factor of: |
|---|---|---|---|---|---|---|
| | $C_7F_{16}$ | $C_7H_{16}$ | | $C_6F_{11}CF_3$ | $C_6H_{11}CH_3$ | |
| Helium | 1120 | 4020 | 3.6 | 1320 | 6370 | 4.8 |
| Neon | | | | 885 | 4500 | 5.1 |
| Hydrogen | 714 | 1450 | 2.0 | | | |
| Carbon Monoxide | 258 | 578 | 2.2 | | | |
| Argon | 185 | 400 | 2.2 | 217 | 539 | 2.5 |
| Krypton | | | | 119 | 173 | 1.5 |
| Carbon Dioxide | 47.9 | 82.6 | 1.7 | | | |
| Xenon | | | | 59.2 | 43.5 | 0.7 |

Our findings indicate that all liquid fluorocarbons — including those with eight or more carbon atoms — can be employed for the absorption of the contaminants. Of course, certain liquid fluorocarbons are more suitable than others for a particular separation from the standpoints of cost, capacity, selectivity, boiling point, critical point, etc. The absorption operation must, of course, be conducted at temperatures below the liquid solvent boiling point prevailing in the absorption zone; the boiling point, in turn, is limited to values below the critical point of the solvent. In most cases, the solubility of the aforementioned contaminants in liquid fluorocarbons increases as the temperature is decreased, the solubility increase being more rapid with respect to the more soluble contaminants. As the temperature is decreased, the selectivity for highly soluble gases—such as $N_2O$, $CO_2$, and $SO_2$—is increased relative to moderately soluble gases, such as $N_2$ and $O_2$, or to slightly soluble gases, such as $H_2$ and $He$.

The absorbent in our process preferably is a liquid fluorocarbon selected from the group consisting of alkane and cycloalkane derivatives having at least one fluorine atom; perfluoroamines, including heterocyclic compounds; and perfluoroethers, including heterocyclic compounds. Some suitable examples of the alkane and cycloalkane derivatives are: straight-chained compounds, such as $CBrF_3$, $CCL_2F_2$, $CHCLF_2$, $C_2CL_2F_4$, and $C_3CL_2F_6$; branched-chained comopounds, such as $C_5F_{12}$; and cyclic compounds, such as $c$-$C_4F_8$. The perfluoroamine for example, be $(C_4F_9)_3N$, and the perfluoroether be $C_3F_7CF_2OCF_2C_3F_7$. An example of a heterocyclic ether absorbent is

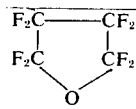

Other types of fluorocarbons can be used—as, for example, perfluoro alcohols, ketones, acids, and esters; but these are less suitable when all of their properties—selectivity, stability, corrosiveness, etc.—are considered.

Because liquid fluorocarbon absorbents typically operate with high gas loadings, the feasibility of a given selective-absorption process using such solvents cannot be predicted with assurance without experimental work to determine the equilibrium properties and the dynamic properties of the system of interest. That is, with fluorocarbon absorbents (many of which are polar) the process solutions are not the ideal dilute solutions usually encountered in absorption processes. Consequently, it is not evident a priori how the solute-solute interactions will affect equilibrium mass transfer, and the like. Our work with the above-mentioned desired components has shown that in these instances, at least, selective absorption is feasible and practical.

In some of its applications our absorption process differs from typical absorption processes in that the desired component (hydrogen or helium) is not selectively absorbed but rather is obtained by selectively absorbing a contaminant which is the main component of the feed gas. This approach is practical because of the high solvent capacity of flurorcarbon absorbents and because of the rapidity with which they dissolve gases in standard equipment, even when gas loadings of the solvent are high.

EXAMPLE I

Removal of Helium from Gaseous Mixtures

The following is an illustration of our process as directed to the production of 0.84 ton/day of high-purity (99.5 percent) ehlium from a stream of natural gas flowing at a rate of 10,000 scfm and comprising 2.1 percent helium. The by-product natural gas has a purity of approximately 73 percent, virtually all of the remainder being nitrogen.

Referring to FIG. 1, the above-mentioned stream of natural gas is fed to a dual-inlet compressor 1. The compressor increases the gas pressure to 40 atmospheres, the pressure selected for the absorption operation. The gas discharged from the compressor is fed through a standard dessicator (not shown) and then through a cooler 2 for reducing its temperature to 0°F, the temperatur its temperature to 0°F, the temperature selected for the absorption operation. The cooled gas is introduced to the bottom of an absorber 3, which is a vertically oriented column of the buttle-cap tray type. The gas rises in the column, where it is contacted with a downflowing liquid fluorocarbon, $CCL_3F$, introduced to the upper part of the absorber through an inlet 4. As a result of this contact, essentially all of the gaseous contaminants (e.g., methane, nitrogen) are absorbed in the solvent, along with a very small percentage of helium. The unabsorbed gas, which is essentially pure helium, is removed from the absorption zone through a product withdrawal line 5 for immediate use or for storage.

In the absorber the downflowing liquid solvent, enriched in the gaseous contaminants, flows through a bottom withdrawal line 6 and then through a flash chamber 7. The chamber 7 is maintained at a pressure of 5 atmospheres and a temperature of 20°F, under which conditions part of the absorbed contaminants flash off and are returned through a gas-recycle line 8 to an intermediate point in the compressor 1 for blending with incoming feed gas. The liwuid solvent effluent from chamber 7 is fed through a second flash chamber 9 maintained at ~20°F and 1 atmosphere, under which conditions additional absorbed contaminants are flashed off from the solvent. These, together with some solvent vapor, flow through a withd rawal line 10 and into a condenser 11.

The liquid solvent effluent from the flash chamber 8 is introduced, through an inlet 12, to the upper portion of a vertically oriented stripper column 13 of the bubble-cap tray type. The stripper 13 is maintained at 75°F and 1 atmosphere. The liquid solvent introduced through inlet 12 flows downwardly through the column into a solvent reboiler 14 connected into the bottom of the column. In the stripper 13, the downflowing solvent is contacted with solvent vapors rising from the reboiler. As a result, nearly all of the absorbed gas in the solvent is stripped therefrom. The stripped gas, together with solvent vapor and flashed-off gaseous components from the chamber 9, flows into the aforementioned overhead condenser 11, which is operated at a temperature providing the desired solvent reflux at the pressure of operation and controlling solvent vapor looses to a desired level. The liquefied vapor drains back into the stripper through a line 15. The non-condensable gas, comprising 73.2 percent natural gas and 26.8 percent nitrogen, is withdrawn from the condenser through a reject-gas line 16 for use or storage.

Purified (regenerated) liquid solvent is withdrawn from the bottom of the reboiler 14 by means of a recycle pump 17 and passed through a chiller 18 for cooling the solvent to 0°F. The cold solvent effluent from the chiller is fed to inlet 4 of the absorber 3 for recontacting feed gas therein.

Tables 5 and 6, below, summarize respectively the plant performance data and the column design data for the above-described example of our process. (In these tables, and also in Tables 7 and 8, compositions are shown in mole percent. The parameter L/kG is the ratio of liquid downflow in moles/hr. to gas upflow in moles/hr. divided by the equilibrium constant.) It will be understood that these data do not necessarily represent the optimum operating conditions for the process. It will also be understood that our process as directed to the recovery of helium from gas mixtures is not limited to natural gas as a feed mixture but is applicable to the separation of helium from other gases—e.g., air.

TABLE 5

PLANT PERFORMANCE DATA—He FROM NATURAL GAS

| | Flow Rate, scfm | Composition, % | | |
|---|---|---|---|---|
| | | Helium | Nitrogen | Methane and Hydrocarbons |
| Process Feed | 10,000 | 2.1 | 26.2 | 71.7 |
| Helium Product | 210 | 99.5 | 0.5 | trace |
| Natural Gas 9CTA Product | 9,790 | <0.01 | 26.8 | 73.2 |
| Absorber Feed | 14,570 | 1.6 | 30.3 | 68.1 |
| Flash Recycle | 4,570 | 0.5 | 39.3 | 60.2 |
| $CCl_3F$ Solvent Flow | 13,600 gpm | | | |

Helium Production = 0.84 ton/day at 99.5% purity

TABLE 6

COLUMN DESIGN DATA

| | Absorber | Recycle Flash | Stripper |
|---|---|---|---|
| Operating Pressure, atmospheres | 40 | 5 | 1 |
| Operating Temperature, °F | 0 | 20 | 75 |
| Key Component | Nitrogen | | Methane |
| L/kG (or L/kV) for Key Component | 1.15 | | 0.1 |
| Percent Absorbed of Key | 99.96 | | 99.99 |
| Column Type | Bubble Cap Tray | | Bubble Cap Tray |
| Number of Theoretical Plates | 13 | | 3 |
| Number of Actual Trays | 20 | | 5 |
| Approximate Column Diameter, feet | 16 | | 16 |

EXAMPLE II

Recovery of Hydrogen from Gas Mixtures Containing Methane

FIG. 1 illustrates a system wherein our method is conducted to recover hydrogen from a feed gas comprising 61 mole percent hydrogen and 39 mole percent methane. At a process feed rate of 865,00 scfd, essentially 95 percent of the hydrogen input is recovered as a gas stream containing less than one ppm methane.

Referring to FIG. 1, the equipment lay-out and the process flows are generally similar to those described above in connection with the recovery of helium. As indicated, the feed gas is passed through a compressor 1, a dessicator (not shown), and a cooler 2 to bring the gas to absorption-zone pressure (30 atmospheres) and temperature (20°F). The feed gas from the cooler 2 is fed into the base of a packed-column absorber 3, where it is contacted with a downflowing liquid fluorocarbon ($CCl_3F$) admitted to the absorber through an upper inlet 4. As a result of this contact, virtually all of the methane is absorbed in the fluorocarbon. The unabsorbed gas (hydrogen containing less than one ppm methane) is withdrawn from the top of the absorber through a line 5 for use or storage. The methane-rich fluorocarbon absorbent flows from the base of the absorber and through a flash chamber 7, maintained at 10 atmospheres and 20°F. Here, part of the absorbed gas is flashed off and recycled, at a flow rate of 173,000 scfd, to the compressor 1. Thus, the total gas feed to the absorber is 1,038,000 scfd. The stream so recycled comprises 45 mole percent hydrogen and 55 mole percent methane.

The liquid absorber effluent from chamber 7 is passed through a second flash chamber 9 and then through an inlet 12 in the top portion of a packed-column stripper 13. The chamber 9 is operated at 1 atmosphere and ~20°F to flash off additional absorbed gas. This gas, together with some solvent vapor, is directed through a line 10 and into an overhead condenser 11 for the stripper. The liquid solvent introduced to the stripper through inlet 12 flows downwardly into a reboiler 14, countercurrently contacting solvent vapor rising from the reboiler. As a result, nearly all of the gases dissolved in the solvent are desorbed. The desorbed gas, together with solvent vapor, is fed into the overhead condenser 11, along with the flashed-off components from the chamber 10. The flow rate of desorbed gas into the condenser is 364,000 scfd. The condenser is operated at a temperature providing suitable reflux and liquefying the solvent vapor to control vapor losses. The liquefied vapor drains back into the stripper. The non-condensables are withdrawn from the condenser through line 16 as a by-product gas comprising 7.3 mole percent hydrogen and 92.7 mole percent methane. As indicated, a pump 17 withdraws regenerated fluorocarbon solvent from the bottom portion of the reboiler and recycles it to the absorber 3 via a cooler 18, which is designed to chill the solvent to 20°F. Tables 7 and 8, below, present the plant performance data and the column design data for the system. The process can be readily adapted to different feed rates, feed compositions, and the like. As an example, Table 9 presents performance data for the system just described when the process feed comprises 98 percent hydrogen and only 2 percent methane.

TABLE 7

PERFORMANCE DATA — HIGH METHANE FEED

| | Flow Rate scfd | Composition, % | |
|---|---|---|---|
| | | Hydrogen | Methane |
| Process Feed | 865,000 | 61 | 39 |
| Absorber Product Gas | 501,000 | pure | <1 ppm |
| Recycle Gas Stream | 173,000 | 45 | 55 |
| Absorber Feed Gas | 1,038,000 | 58.3 | 41.7 |
| Stripper Product Gas | 364,000 | 7.3 | 92.7 |
| $CCl_3F$ Flow RAte=380 gpm | | | |
| Hydrogen Recovery=95% | | | |

TABLE 8

COLUMN DESIGN DATA

| | Absorber | Flash | Stripper |
|---|---|---|---|
| Operating Pressure, atmospheres | 30 | 10 | 1 |
| Operating Temperature, °F | 20 | 20 | 75 |
| Key Component | Methane | | Methane |
| L/kG (or L/kV) for Key Component | 1.85 | | 0.12 |
| Number of Transfer Units | 35 | | 10 |
| HTU, ft | 3 | | 3 |
| Packing (Pall Rimgs) Size, inches | 3 | | 3 |
| Column Packed Height, ft | 105 | | 30 |
| Column Diameter, ft | 7 | | 7 |
| Approximate Solvent Boilup, lb mol/hr | | | 60 |

TABLE 9

PERFORMANCE DATA — LOW METHANE FEED

| | Flow Rate, scfd | Composition, % Hydrogen | Methane |
|---|---|---|---|
| Process Feed | 865,000 | 98 | 2 |
| Absorber Product Gas | 802,000 | pure | <1 ppm |
| Recycle Gas Stream | 173,000 | 96 | 4 |
| Absorber Feed Gas | 1,038,000 | 97.7 | 2.3 |
| Stripper Product Gas | 63,000 | 72.5 | 27.5 |

$CCl_3F$ Flow Rate=380 gpm
Hydrogen Recovery=95%

It will be understood that our process for the selective recovery of hydrogen from gas mixtures is not limited to the particular mixture illustrated above but rather is applicable to various other mixtures, such as the off-gas (mainly oxygen and hydrogen) from electrlytic cells.

Referring to Examples 1 and 2, above, it is emphasized that our process is adapted for a wide range of product purities, equipment types, feed compositions, and operating conditions. In some instances it may be deadvantageous to supplement or to supplant the flash chambers 7, 9 with one or more fractionating columns operated at a pressure below that in the absorber. In the fractionating column the liquid fluorocarbon effluent from the absorber is contacted with a flowing stripping medium, such as fluorocarbon vapor, to remove the less soluble gases therefrom. The stripped gases may be recycled to an appropriate point in the absorber. The use of such a fractionator also will provide even higher percentages of recovery for the desired component. It is advantageous, especially when throughputs are high, to introduce the column feeds at points selected to minimize back-mixing with streams of different concentration.

As a further example of the flexibility of the process, the stripping operation described above in connection with column 13 need not be conducted with a vapor but can be conducted with some other gaseous stripping agent, such as a reactive or a condensable gas. For example, $CO_2$ may be so used. While our processes for hydrogen or helium recovery can be conducted with a wide variety of liquid fluorocarbon solvents, as described, especially good results can be obtained with solvents such as $CCl_3F$, $CCl_2F_2$, $CHCl_2F$, and $C_3Cl_2F_6$.

As a final illustration of the flexibility of our process, the pressure in the absorption zone may vary from one to hundreds of atmospheres whereas the stripping zone pressure may range from below one to tens of atmospheres. The absorption-zone temperature may range satisfactorily from about —200° to 250°F.

It will be apparent to those skilled in the art that various modifications can be made within the scope of our invention, whose scope is to be determined by reference to the appended claims.

What is claimed is:

1. The process of recovering a component selected from the group consisting of hydrogen and helium from a gas mixture containing said component and any of such other components as other constitutents of air, hydrocarbons or various impurities such as hydrogen sulfide and oxides of carbon, nitrogen and sulfur, said process comprising passing said mixture through an absorption zone at superatmospheric pressure and a temperature in the range of about —200 to +250°F in the folowing contact with a iquid fluorocarbon to preferentially absorb in said fluorcarbon constituents of said mixture more soluble therein than said component, withdrawing from said absorption zone a stream of said liquid fluorocarbon enriched in said constituents, and separately withdrawing from said zone unabsorbed gas enriched in said componet.

2. The process of claim 1 wherein said stream enriched in said constitutents is passed through a gas-stripping zone at a lower pressure than said absorber to desorb gaseous constituents dissolved therein, thereby regenerating said liquid fluorocarbon for recycle to said absorption zone for flowing contact with said mixture.

3. The process of claim 2 wherein prior to passage through said gas-stripping zone, said stream enriched in said constitutents is passed through a fractionating zone at a pressure intermediate of the respective pressures in said absorption zone and said gas-stripping zone to desorb from said stream part of said constituents dissolved therein.

4. The process of claim 3 wherein constituents desorbed in said fractionating zone are recycled for blended with said mixture prior to passage of said mixture through said absorption zone.

5. The process of claim 1 wherein said liquid fluorocarbon is a member selected from the group consisting of alkane and cycloalkane derivatives having at least one fluorine atom; perfluoroamines; and perfluoroethers.

6. The process of recovering hydrogen from a gaseous mixture containing mainly hydrogen and methane, said process comprising passing said mixture through an absorption zone at superatomspheric pressure and a temperature in the range of about —200 to +250°F in flowing contact with a liquid fluorocarbon to preferentially absorb in said fluorcarbon constituents of said mixture more soluble therein than hydrogen, withdrawing from said absorption zone a stream of saod liquid fluorocarbon enriched in said constituents, and separately withdrawing from said zone unabsorbed gas enriched in hydrogen.

7. The method of claim 6 wherein said liquid fluorocarbon is a member selected from the group consisting of alkane and cycloalkane derivatives having at least one fluorine atom; perfluoroamines; and perfluoroethers.

8. The process of recovering helium from a gaseous mixture containing helium and a low-boiling main constituent selected from the group consisting of methane and nitrogen, said process comprising passsing said mixture through an absorption zone at superatmospheric pressure at a temperature in the range of about —200 to +250°F in flowing contact with a liquid fluorocarbon to preferentially absorb in said fluorocarbon constituents of said mixture more soluble therein than helium, withdrawing from said absorption zone a stream of said liquid fluorocarbon enriched in said constituents, and separately withdrawing from said zone unabsorbed gas enriched in helium.

9. The method of claim 8 wherein said liquid fluorocarbon is a member selected from the group consisting of alkane and cycloalkane derivatives having at least one fluorine atom; perfluoroamines; and perfluoroethers.

10. The method of claim 6 wherein said gaseous mixture contains low-boiling impurities in the amount from about 0.5 percent to 40 percent by volume.

* * * * *

UNITED STATES PATENT OFFICE
CERTIFICATE OF CORRECTION

Patent No. 3,785,120                    Dated January 15, 1974

Inventor(s) James R. Merriman et al.

It is certified that error appears in the above-identified patent and that said Letters Patent are hereby corrected as shown below:

Column 8, line 15, delete "the temperatur its temperature to 0°F,"; line 18, "buttle-cap" should read "bubble-cap--.line 38 "liwuid" should read --liquid--; line 43 "withd rawal" should read --withdrawal--; line 61 "looses" should read --losses--.

Column 9, Table 5, first column "9CTA" should be deleted after "Natural Gas" .

Column 10, Table 8, first column "Rimgs" should read --Rings--.

Column 11, line 15, "electrlytic" should read --electrolytic--; line 60 "constitutents" should read --constituents--; line 65 "the", second occurrence, should be deleted; line 66, "folowing" should read --flowing-- and "iquid" should read --liquid--.

Column 12, line 5, "componet" should read --component--; lines 7, 9, and 15 "constitutents" should read --constituents--; line 22 "blended" should read --blending--; line 35 "fluorcarbon" should read --fluorocarbon--; line 37, "saod" should read --said--; line 49, "passsing" should read --passing--.

Signed and sealed this 13th day of August 1974.

(SEAL)
Attest:

McCOY M. GIBSON, JR.                C. MARSHALL DANN
Attesting Officer                   Commissioner of Patents